US008292018B2

(12) United States Patent
Huang

(10) Patent No.: US 8,292,018 B2
(45) Date of Patent: Oct. 23, 2012

(54) INTEGRATED WHEEL AND ELECTRIC SCOOTER USING THE WHEEL

(75) Inventor: Wen-Hung Huang, Taipei County (TW)

(73) Assignee: Dijiya Energy Saving Technology Inc., Banqiao, Taipei County (TW)

( * ) Notice: Subject to any disclaimer, the term of this patent is extended or adjusted under 35 U.S.C. 154(b) by 0 days.

(21) Appl. No.: 13/038,840

(22) Filed: Mar. 2, 2011

(65) Prior Publication Data

US 2012/0048636 A1 Mar. 1, 2012

(30) Foreign Application Priority Data

Sep. 1, 2010 (TW) ............................... 99216976 U

(51) Int. Cl.
*B62D 61/02* (2006.01)
(52) U.S. Cl. ........................................................ 180/220
(58) Field of Classification Search .................. 180/220, 180/223; 280/278, 221, 87.041, 87.05; 301/5.306, 301/5.1, 6.5, 11.1, 11.2, 37.23
See application file for complete search history.

(56) References Cited

U.S. PATENT DOCUMENTS

| | | | | |
|---|---|---|---|---|
| 2,083,766 A * | 6/1937 | Wittkopp | .................... | 152/379.3 |
| 3,930,683 A * | 1/1976 | MacKeown | .................... | 301/11.1 |
| 6,068,343 A * | 5/2000 | Madore et al. | ............. | 301/5.308 |
| 6,428,021 B1 * | 8/2002 | Tung | ........................ | 280/87.041 |
| 6,467,519 B1 * | 10/2002 | Owen | ........................... | 152/393 |
| 6,619,679 B2 * | 9/2003 | Lan | ............................. | 280/87.05 |
| 6,688,703 B1 * | 2/2004 | Wang | .......................... | 301/37.23 |
| 6,848,697 B2 * | 2/2005 | Lan | ............................. | 280/87.05 |
| 6,860,568 B2 * | 3/2005 | Nunes | ......................... | 301/37.23 |
| 7,334,617 B2 * | 2/2008 | Hill et al. | ......................... | 152/47 |
| 7,878,600 B2 * | 2/2011 | Krantz | ....................... | 301/5.306 |
| 2002/0050696 A1 * | 5/2002 | Lan | ........................... | 280/87.041 |
| 2002/0195786 A1 * | 12/2002 | Tsai | ........................... | 280/87.05 |
| 2003/0214108 A1 * | 11/2003 | Lan | ............................. | 280/87.05 |
| 2005/0073121 A1 * | 4/2005 | Chen | .......................... | 280/87.05 |
| 2005/0257871 A1 * | 11/2005 | Hill et al. | ....................... | 152/323 |
| 2006/0103097 A1 * | 5/2006 | Chen | .......................... | 280/87.05 |
| 2008/0303337 A1 * | 12/2008 | Krantz | ....................... | 301/5.306 |
| 2009/0278327 A1 * | 11/2009 | Chan | .......................... | 280/87.05 |
| 2009/0322049 A1 * | 12/2009 | Tsai | ........................... | 280/87.05 |
| 2011/0031710 A1 * | 2/2011 | Lin | ............................. | 280/87.05 |
| 2011/0316247 A1 * | 12/2011 | Johnson | ..................... | 280/87.05 |

* cited by examiner

*Primary Examiner* — Tashiana Adams
(74) *Attorney, Agent, or Firm* — Muncy, Geissler, Olds & Lowe, PLLC

(57) ABSTRACT

An integrated wheel and an electric scooter using the wheel are disclosed. The electric scooter comprises an operation level and a footrest. The operation lever is provided with a front wheel at a lower end thereof. The footrest is provided with a rear wheel at a rear end thereof. At least one of the front and rear wheels is an integrated wheel. The integrated wheel comprises a wheel rim and a rubber tire. The external periphery of the wheel rim is provided with a plurality of positioning grooves. The rubber tire is integratedly formed on the external periphery of the wheel rim and has an internal periphery provided with a plurality of blocks each of which is correspondingly engaged into one of the positioning grooves. Thereby, the wheel rim can be firmly fixed with the rubber tire so as to prolong the lifetime of the wheel and ensure the driving safety.

9 Claims, 6 Drawing Sheets

INTEGRATED WHEEL AND ELECTRIC SCOOTER USING THE WHEEL

TECHNICAL FIELD

The present invention relates to an integrated wheel capable of preventing the detachment of a wheel rim from a rubber tire and an electric scooter using the wheel so as to prolong the lifetime of the wheel and ensure the driving safety.

BACKGROUND

Recently, most large vehicles utilize inflatable rubber tires in order to obtain shockproof effect. As for the manually operated flat cars, these cars usually utilize integrated rubber tires because their driving speed is usually lower. But, these tires usually have poor structural properties. Accordingly, when the flat cars are modified to be driven electrically, the driving speed of the electric flat cars becomes faster and consequently the tires thereof are inevitably to bear more force. Therefore, the tires may be damaged easily because the original tire structure of these tires is unable to bear such an increased force.

Moreover, the electric flat cars recently in the market are usually designed to be equipped with folding structure for storing purpose. However, when the folding structure is unfolded several times, the structure may easily become unstable, which may invoke uncomfortable feelings and even may affect the driving safety.

In order to overcome above shortcomings, inventor had the motive to study and develop the present invention. After hard research and development, the inventor provides an integrated wheel and an electric scooter using the wheel so as to stabilize the structure and prolong the lifetime of the wheel, and ensure the comfort and driving safety for users.

SUMMARY OF THE DISCLOSURE

An object of the present invention is to provide an integrated wheel, where a wheel rim and a rubber tire are integratedly made and a positioning structure is provided to combine the wheel rim and the rubber tire. Consequently, the wheel rim and the rubber tire will not detach from each other, and the lifetime of the wheel can be prolonged and the driving safety can be ensured.

Another object of the present invention is to provide an integrated wheel, where the wheel rim and the rubber tire are made integratedly and the wheel rim is designed to be a rotor for a motor. Consequently, the wheel can be used as a driving wheel, and the wheel rim and the rubber tire can be firmly connected with each other even when the wheel rotates at a high speed.

Another object of the present invention is to provide an electric scooter having integrated wheels and dual positioning folding structure. Consequently, when the electric scooter is unfolded, its structure is more stable. Thereby, the driving safety can be ensured and more comfort is provided to users.

In order to achieve above objects, the present invention provides an integrated wheel comprising a wheel rim and a rubber tire. The wheel rim includes a left lateral surface and a right lateral surface opposite to the left lateral surface. An external periphery and an internal periphery opposite to the external periphery are provided between the left and right lateral surfaces. The external periphery of the wheel rim is circularly provided with a plurality of positioning grooves. The rubber tire is integratedly formed on the external periphery of the wheel rim and has an internal periphery provided with a plurality of blocks each of which is correspondingly engaged into one of the positioning grooves.

During implementation, the present invention further comprises a left lateral plate and a right lateral plate. The left lateral plate is fixed onto the left lateral surface of the wheel rim and the rubber tire while the right lateral plate is fixed onto the right lateral surface of the wheel rim and the rubber tire.

During implementation, the left lateral surface of the rubber tire is provided with a left engaging groove for engaging the left lateral plate therein. The right lateral surface of the rubber tire is provided with a right engaging groove for engaging the right lateral plate therein.

During implementation, the positioning grooves are in strip shape and the cross-section of each positioning groove is in dovetail shape.

During implementation, the wheel rim is made by magnetic steel and is used as the rotor of a motor. Alternatively, the wheel rim can be fitted on the rotor of a motor.

During implementation, the present invention further comprises a folding mechanism. The folding mechanism is connected between the operation level and the footrest for rotating and folding the operation level onto the footrest. The folding mechanism comprises a fixing seat, a turning element, a first positioning component, and a second positioning component. The fixing seat is connected to a front end of the footrest and is provided with a first positioning part at one end thereof. The front end of the turning element is connected with the operation level. The turning element is also pivotally connected with the fixing seat. Besides, the turning element is provided with a second positioning part thereon. The first positioning component is connected with the turning element in a way capable of relative reciprocating rotation, so that the first positioning component is engaged with the first positioning part when the first positioning component is turned. The second positioning component is connected with the fixing seat in a way capable of relative reciprocating rotation. The second positioning component is provided with an engaging part at one end thereof for being engaged with the second positioning part.

The following detailed description, given by way of examples or embodiments, will best be understood in conjunction with the accompanying drawings.

DETAILED DESCRIPTION

Figure 1:
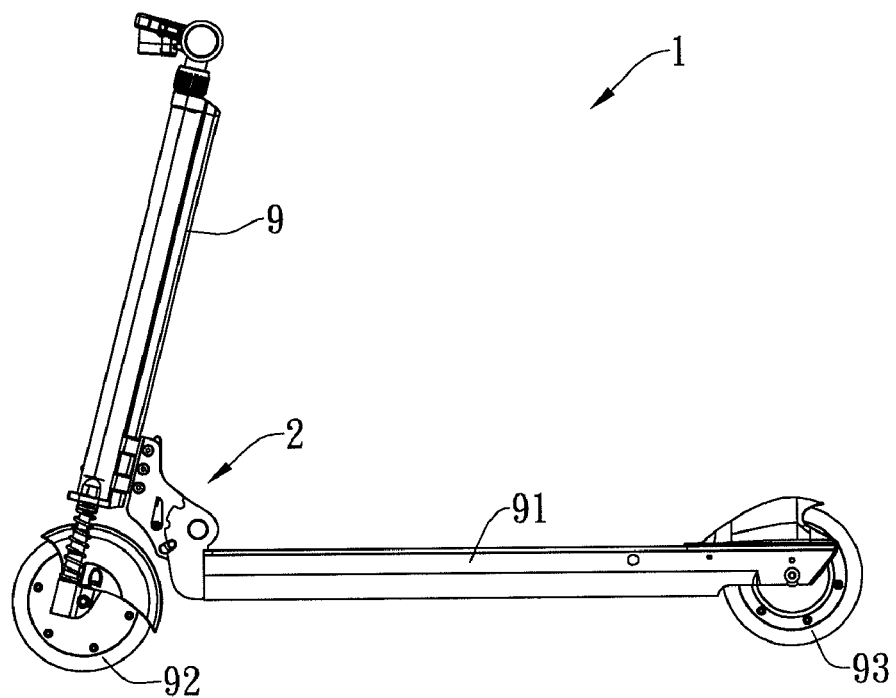
FIG. 1 is a lateral view of a preferred embodiment of the present invention.

Please refer to FIG. 1, which shows a preferred embodiment of an electric scooter 1 according to the present invention. The electric scooter 1 comprises an operation level 9, a footrest 91, and a folding mechanism 2. A front wheel 92 is provided at a lower end of the operation lever 9. A rear wheel 93 is provided at a rear end of the footrest 91. The folding mechanism 2 is connected between the operation level 9 and the footrest 91 for rotating and folding the operation level 9 onto the footrest 91.

Figure 2:
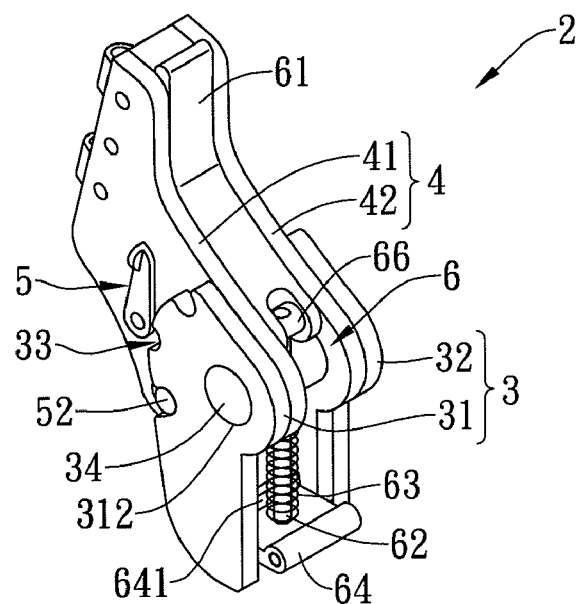
FIG. 2 is a perspective view of a preferred embodiment of the folding mechanism of the present invention.
Figure 3:
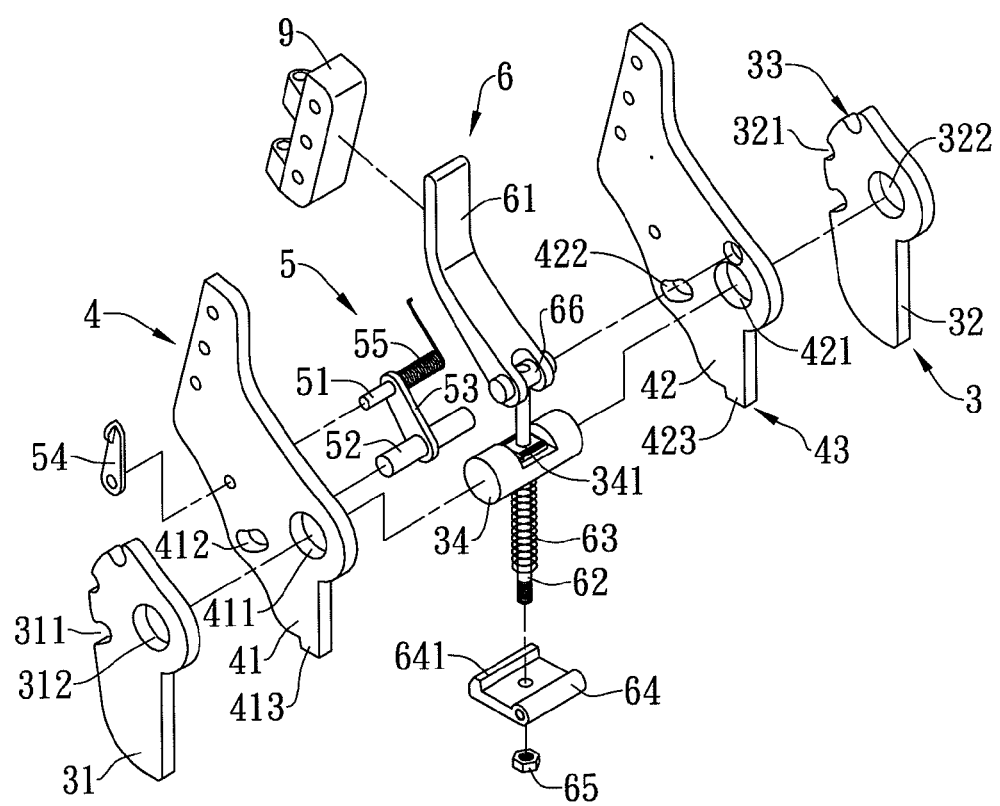
FIG. 3 is an exploded perspective view of the preferred embodiment of the folding mechanism of the present invention.
Figure 4:
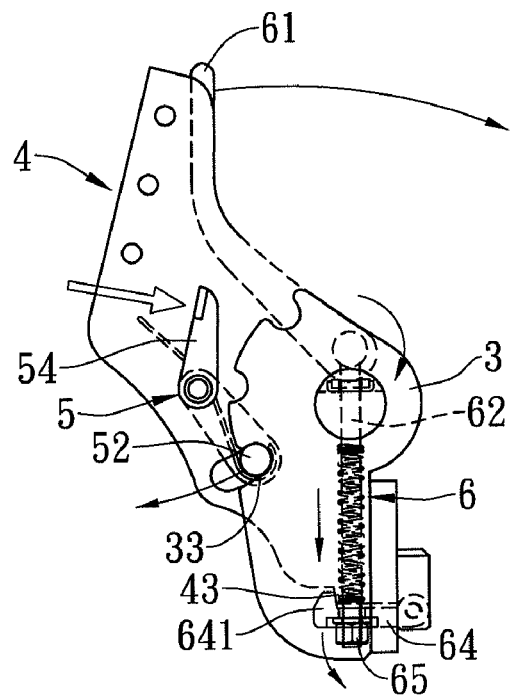
FIGS. 4 and 5 are diagrams showing the use of the present invention before the present invention is folded.
Figure 5:
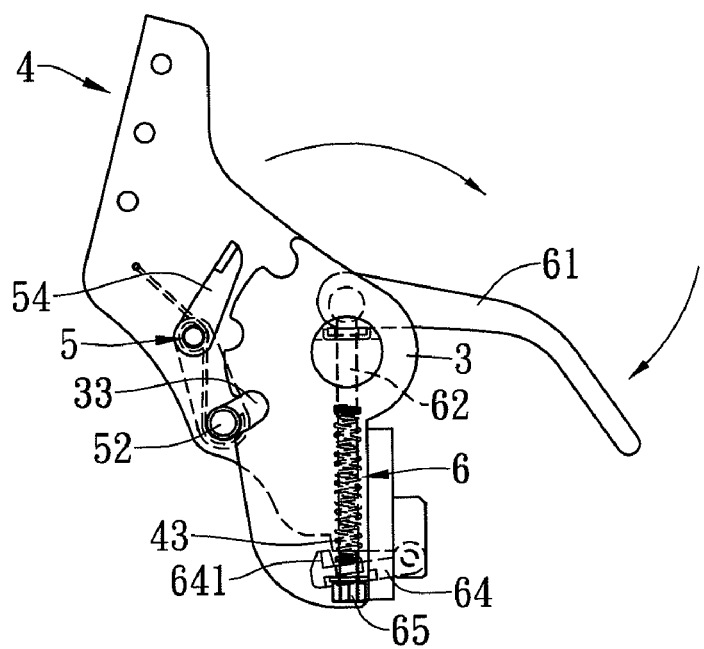
Figure 6:
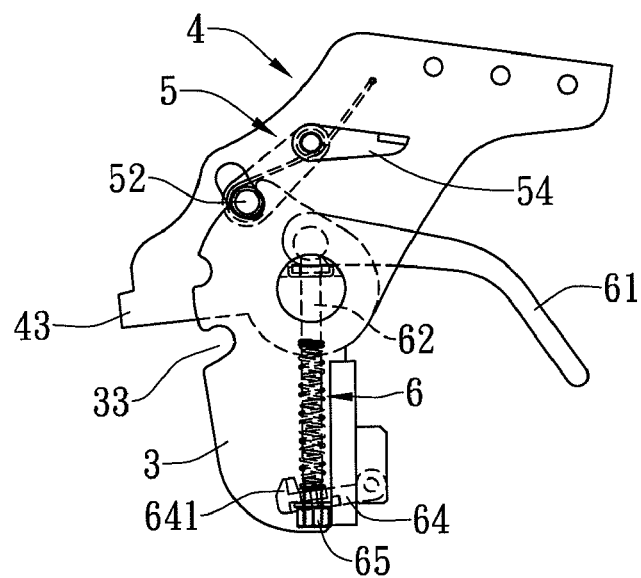
FIGS. 6 and 7 are diagrams showing the use of the present invention after the present invention is folded.
Figure 7:
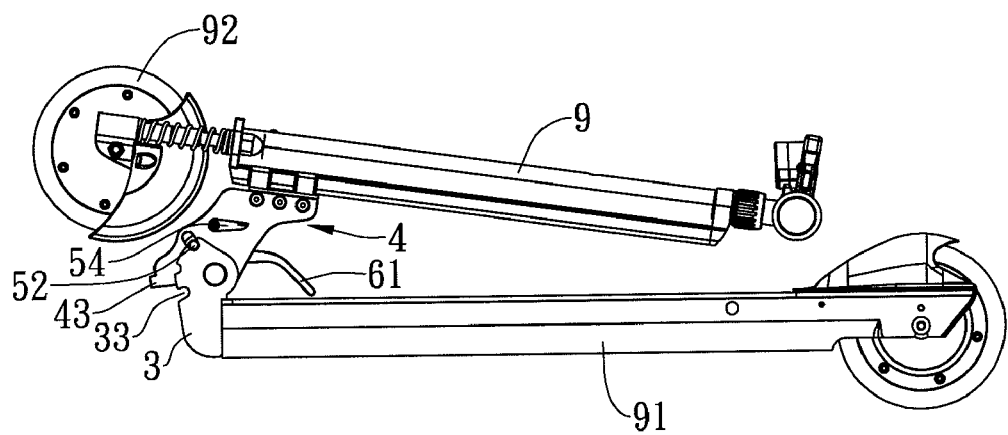

Please refer to FIGS. 2 and 3. The folding mechanism 2 comprises a fixing seat 3, a turning element 4, a first positioning component 5, and a second positioning component 6.

The fixing seat 3 includes a left fixing plate 31 and a right fixing plate 32. The left fixing plate 31 is provided with a plurality of left recesses 311 at the front periphery thereof. The right fixing plate 32 is provided with a plurality of right recesses 321 at front periphery thereof Each left recess 311 is corresponding to one right recess 321. The left recesses 311 and the right recesses 321 form a first positioning part 33. The left fixing plate 31 and the right fixing plate 32 are respectively provided with a pivotal hole 312, 322. The two pivotal holes are pivotally connected with each other via a pivot 34. The pivot 34 is provided with a guiding hole 341. The rear ends of the left fixing plate 31 and the right fixing plate 32 are respectively fixed to the front end of the footrest 91.

The turning element 4 is positioned between the left fixing plate 31 and the right fixing plate 32. The turning element 4 includes a left turning plate 41 and right turning plate 42. The left turning plate 41 and the right turning plate 42 are respectively provided with an axial hole 411, 421 that is coaxial with the pivotal holes 312, 322 of the fixing seat 3. The pivot 4 passes through the pivotal holes 312, 322 and the axial holes 411, 421. Consequently, the turning element 4 is pivotally connected with the fixing seat 3, so that the turning element 4 can rotate relative to the fixing seat 3. Besides, the front ends of the left turning plate 41 and right turning plate 42 are respectively connected to the operation level 9. The left turning plate 41 is provided with a curved-shape left guiding groove 412 while the right turning plate 42 is provided with a right guiding groove 422 that is in curved shape and is corresponding to the left guiding groove 412. A left downward protruding part 413 is formed at the lower end of the left turning plate 41. A right downward protruding part 423 is formed at the lower end of the right turning plate 42 and is corresponding to the left downward protruding part 413. The left downward protruding part 413 and the right downward protruding part 423 together form a second positioning part 43.

The first positioning component 5 is positioned between the left turning plate 41 and the right turning plate 42. Besides, the first positioning component 5 includes a straight rod 51, a positioning rod 52, a connection plate 53, a handle 54, and an elastic piece 55. The straight rod 51 and the positioning rod 52 are arranged to be parallel to each other. Two ends of the connection plate 53 are respectively connected with the straight rod 51 and the positioning rod 52, so that the arrangement of the straight rod 51, the positioning rod 52, and the connection plate 53 are generally in H shape. Moreover, after the two ends of the straight rod 51 are pivotally connected with the left turning plate 41 and right turning plate 42, one end of the straight rod 51 is connected with the handle 54. The elastic piece 55 is a torsion spring. The elastic piece is fitted on the straight rod 51, so that the straight rod 51 can return to its original position after being turned. Furthermore, the two ends of the positioning rod 52 respectively pass through the left guiding groove 412 and the right guiding groove 422 and then are engaged into any pair of a left recess 311 and a right recess 321 of the first positioning part 33.

The second positioning component 6 is positioned between the left turning plate 41 and the right turning plate 42 and is located at the front side of the first positioning component 5. The second positioning component 6 includes an eccentric handle 61, a pull rod 62, a spring 63, an engaging piece 64, and an adjustable nut 65. The eccentric handle 61 has a lower end pivotally connected with a rod 66. The left and right ends of the rod 66 are respectively pivotally connected to the left turning plate 41 and right turning plate 42. The pull rod 62 is an elongate rod. The top end of the pull rod 62 is connected to the rod 66. After the pull rod 62 is inserted through the guiding hole 341 of the pivot 34 and the engaging piece 64, the lower end of the pull rod 62 is screwed with the adjustable nut 65. The spring 63 is fitted on the pull rod 62. One end of the engaging piece 64 is pivotally connected to the front end of the footrest 91 while another end of the engaging piece 64 is provided with an engaging part 641 protruding upward. Thereby, the second positioning component 6 is connected to the fixing seat 3 in a way capable of relative reciprocating rotation.

Please refer to FIGS. 4-7. When a user presses down the eccentric handle 61 in a clockwise direction, the pull rod 62 is moved downward as a result of the eccentric effect of the lower end of the eccentric handle 61, by which the engaging piece 64 is swung downward, so that the second positioning part 43 at the lower end of the turning element 4 is detached from the engaging part 641 of the engaging piece 64. When the user presses down the handle 54 in a clockwise direction, the positioning rod 52 is detached from the first positioning part 33. In this way, the operation level 9, the front wheel 92, and the turning element 4 can be turned simultaneously to rotate around the fixing seat 3 and folded onto the footrest 91. When the eccentric handle 61 is operated in a reverse way and then the handle 52 is pressed again, the operation level 9 is unfolded relative to the footrest 91. Besides, the whole structure is made more stable by means of the dual positioning effect produced by the first positioning component 5 and the second positioning component 6.

The connection between the second positioning part 43 at the lower end of the turning element 4 and the engaging part 641 of the engaging piece 64 becomes loose when they are used repeatedly for a long period of time. By means of controlling the adjustable nut 65, the engaging force of the engaging part 641 with the second positioning part 43 can be adjusted, so that the engaging part 641 is able to engage the second positioning part 43 more effectively.

Figure 8:
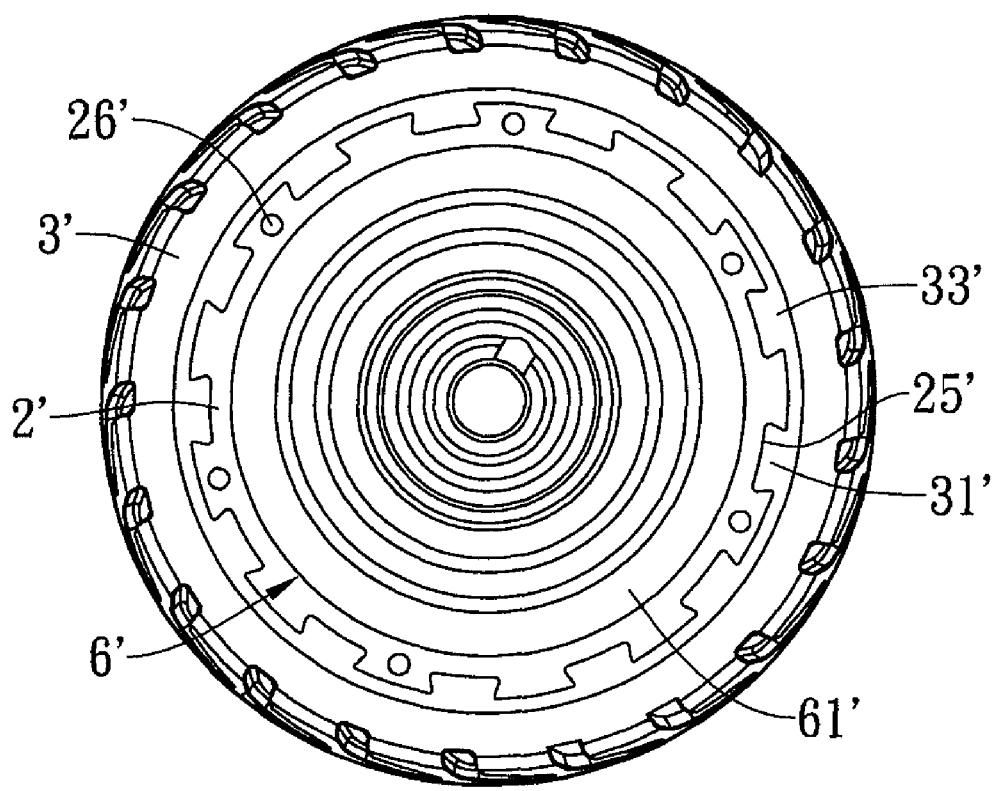
FIG. 8 is a lateral view showing the wheel of the present invention where the right lateral plate is removed.
Figure 9:
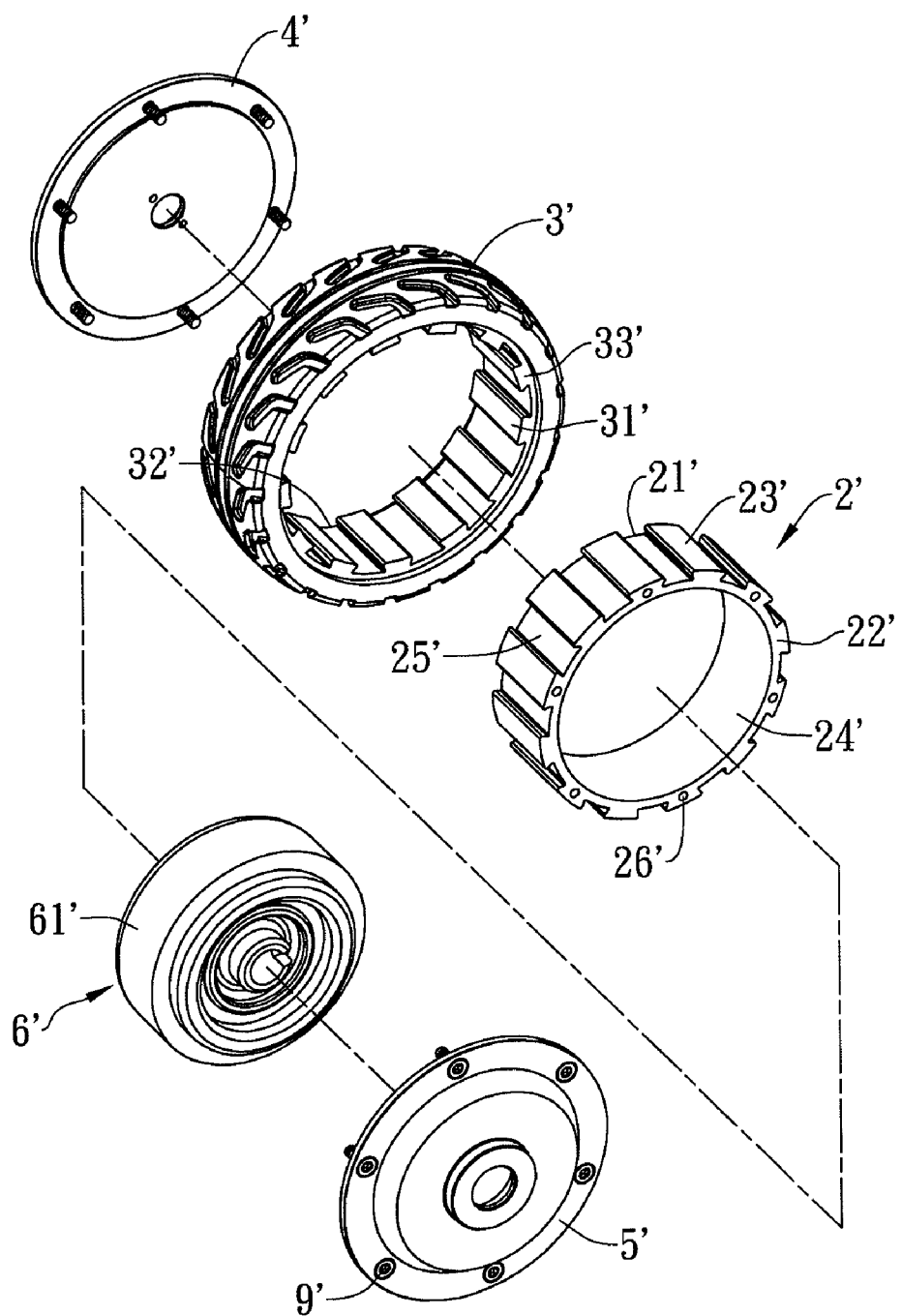
FIG. 9 is an exploded perspective view of the wheel of the present invention.

As shown in FIGS. 8 and 9, at least one of the front wheel 92 and the rear wheel 93 is the integrated wheel. During implementation, both the front wheel 92 and the rear wheel 93 are integrated wheels. Each integrated wheel comprises a wheel rim 2', a rubber tire 3', a left lateral plate 4', and a right lateral plate 5'.

The wheel rim 2' includes a left lateral surface 21' and a right lateral surface 22' that is opposite to the left lateral surface 21'. An external periphery 23' and an internal periphery 24' opposite to the external periphery 23' are provided between the left and right lateral surfaces 21', 22'. The external periphery 23' of the wheel rim 2' is provided with a plurality of strip-shape positioning grooves 25' that are circularly arranged on the wheel rim 2' and are spaced equidistantly with each other. The left ends of the strip-shape positioning grooves 25' are in connection with the left lateral surface 21' of the wheel rim 2' while the right ends of the strip-shape positioning grooves 25' are in connection with the right lateral surface 22' of the wheel rim 2'. Besides, the cross-section of each positioning groove 25' is in dovetail shape. Moreover, the left lateral surface 21' and the right lateral surface 22' of the wheel rim 2' are respectively provided with plural screw holes 26'.

The rubber tire 3' is formed on the external periphery 23' of the wheel rim 2' by an injection molding process. The internal periphery of the rubber tire is provided with a plurality of dovetail-shape blocks 31' each of which is correspondingly engaged into one of the positioning grooves 25'. Besides, the left lateral surface of the rubber tire 3' is provided with a left engaging groove 32' while the right lateral surface of the rubber tire 3' is provided with a right engaging groove 33'.

During implementation, the rubber tire 3' is directly formed on the external periphery 23' of the wheel rim 2'. The left lateral plate 4' and the right lateral plate 5' are respectively inserted into the left engaging groove 32' and the right engaging groove 33', and are respectively fastened onto the left and right lateral surfaces 21', 22' of the wheel rim 2' by screwing screw bolts 9' into the screw holes 26'. Accordingly, the left lateral plate 4' is fastened onto the rubber tire 3' and the left lateral surface 4' of the wheel rim 2' while the right lateral plate 5' is fastened onto the rubber tire 3' and the right lateral surface 22' of the wheel rim 2'. Thereby, it can be used as a driven wheel.

During implementation, the wheel rim 2' can be made by magnetic steel and be used as the rotor 61' of a motor 6'. Alternatively, the wheel rim 2' can be directly fitted on the rotor 61' of a motor 6' for being used as a driving wheel. Thereby, it can move the rubber tire and drive the whole wheel of a vehicle (such as a scooter) when the rotor 61' of the motor 6' rotates.

In this way, when the rubber tire 3' or the wheel rim 2' is subject to the force coming from the left lateral surface 21' or the right lateral surface 22' of the wheel rim 2', they will not slide towards the left or right side along the axial direction because of the stop caused by the left lateral plate 4' or the right lateral plate 5'. Moreover, because the positioning grooves 25' and the blocks 31' are engaged with each other and all have dovetail-shape cross-section, a binding force can be produced in the radial direction between the rubber tire 3' and the wheel rim 2' to combine firmly the rubber tire 3' and the wheel rim 2' and prevent their detachment.

Therefore, the present invention has following advantages:
1. According to the present invention, the wheel rim and the rubber tire are integrated formed by the process of injection molding and a dual positioning structure is provided. Thereby, the wheel rim and the rubber tire can be firmly combined together and they are capable of resisting the impact force from all directions, so that the lifetime of the wheel can be prolonged and the driving safety can be ensured.
2. According to the present invention, the wheel rim can be directly used as a rotor for a motor. Thereby, the wheel can be used as a driving wheel for driving purpose. Thereby, the wheel rim and the rubber tire can be firmly combined with each other even when the wheel rotates at a high speed.
3. According to the present invention, the folding mechanism has a dual positioning structure. Thereby, the whole structure is still stable after being unfolded, and both the comfort and driving safety can be ensured for drivers.
4. According to the present invention, the strength of the engagement between the engaging part and the second positioning part can be restored by means of the adjustable nut when the unfolded structure become loose, so that the comfort and driving safety can be both ensured.

As disclosed in above descriptions and attached drawings, the present invention can achieve desired objectives to provide an integrated wheel and a scooter using the wheel, which have stable structure and longer lifetime and are able to provide drivers with both of the comfort and safety. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:
1. An electric scooter, comprising a operation lever and a footrest, where a front wheel is provided at a lower end of the operation lever; a rear wheel is provided at a rear end of the footrest; at least one of the front and rear wheels is an integrated wheel, and the integrated wheel comprises:
   a wheel rim, including a left lateral surface and a right lateral surface opposite to the left lateral surface; an external periphery and an internal periphery opposite to the external periphery, which are provided between the left and right lateral surfaces; and the external periphery of the wheel rim being circularly provided with a plurality of positioning grooves;
   a rubber tire, integratedly formed on the external periphery of the wheel rim, and the rubber tire having an internal periphery provided with a plurality of blocks each of which is correspondingly engaged into one of the positioning grooves;
   a folding mechanism, wherein the folding mechanism is connected between the operation level and the footrest for rotating and folding the operation level onto the footrest; the folding mechanism comprises:
      a fixing seat, connected to a front end of the footrest and provided with a first positioning part at one end thereof;
      a turning element, a front end of which is connected with the operation level; the turning element being pivotally connected with the fixing seat; and the turning element being provided with a second positioning part thereon: and the turning element includes a left turning plate and right turning plate; the left turning plate and the right turning plate are respectively and pivotally connected with the fixing seat;
      a first positioning component, connected with the turning element in a way capable of relative reciprocating rotation, so that the first positioning component is engaged with the first positioning part when the first positioning component is turned;
      a second positioning component, connected with the fixing seat in a way capable of relative reciprocating rotation, where the second positioning component is provided with an engaging part at one end thereof for being engaged with the second positioning part.

2. The electric scooter as claimed in claim 1, wherein the fixing seat includes a left fixing plate and a right fixing plate; the rear end of the left fixing plate and the rear end of the right fixing plate are respectively connected to the front end of the footrest.

3. The electric scooter as claimed in claim 2, wherein the first positioning part includes a plurality of left recesses formed at front periphery of the left fixing plate, and a plurality of right recesses formed at front periphery of the right fixing plate and corresponding to the left recesses.

4. The electric scooter as claimed in claim 1 wherein the second positioning part includes a left downward protruding part formed at the lower end of the left turning plate and a right downward protruding part formed at the lower end of the right turning plate.

5. The electric scooter as claimed in claim 1 wherein the first positioning component is located between the left turning plate and the right turning plate.

6. The electric scooter as claimed in claim 1 wherein the left turning plate is provided with a left guiding groove while the right turning plate is provided with a right guiding groove; one end of the first positioning component is respectively pivotally connected with the left turning plate and the right turning plate; one end of the first positioning component is connected with an elastic element, so that the first positioning component is connected with the turning element in a way capable of relative reciprocating rotation; another end of the first positioning component is provided with a positioning rod, and two ends of the positioning rod are respectively inserted through the left guiding groove and the right guiding groove and then are engaged with the first positioning part.

7. The electric scooter as claimed in claim 1, wherein the second positioning component is located between the left turning plate and the right turning plate.

8. The electric scooter as claimed in claim 7, wherein the left turning plate and the right turning plate are respectively and pivotally connected with the fixing seat via a pivot; the pivot is provided with a guiding hole; the second positioning component includes an eccentric handle, a pull rod, a spring, and an engaging piece; the eccentric handle has a lower end respectively pivotally connected with the left turning plate and the right turning plate; the lower end of the eccentric handle is connected with the top end of the pull rod; the pull rod is inserted through the guiding hole of the pivot; the spring is fitted on the pull rod; the engaging piece is connected to the lower end of the pull rod; and one end of the engaging piece is pivotally connected to the front end of the footrest while another end thereof is provided with an engaging part for being engaged with the second positioning part.

9. The electric scooter as claimed in claim 8, wherein the lower end of the pull rod is inserted through the engaging piece and is screwed with an adjustable nut.

* * * * *